US006908385B2

(12) United States Patent
Green

(10) Patent No.: US 6,908,385 B2
(45) Date of Patent: Jun. 21, 2005

(54) CASINO VIDEO SECURITY SYSTEM

(75) Inventor: Michael John Green, Sandton (ZA)

(73) Assignee: Technical Casino Services Ltd., Rotherhithe (GB)

(*) Notice: Subject to any disclaimer, the term of this patent is extended or adjusted under 35 U.S.C. 154(b) by 0 days.

(21) Appl. No.: 10/202,370

(22) Filed: Jul. 24, 2002

(65) Prior Publication Data

US 2003/0125109 A1 Jul. 3, 2003

Related U.S. Application Data

(63) Continuation of application No. PCT/GB01/00282, filed on Jan. 24, 2001.

(30) Foreign Application Priority Data

Jan. 24, 2000 (GB) .............................................. 0001591

(51) Int. Cl.$^7$ .............................. A63F 13/00; A63F 9/24
(52) U.S. Cl. .............................. 463/29; 463/16; 463/17
(58) Field of Search ...................... 463/1, 9–29, 40–42; 273/138, 142; 358/108, 210; 348/155, 157, 441; 382/103; 354/266, 290

(56) References Cited

U.S. PATENT DOCUMENTS

| | | | | | |
|---|---|---|---|---|---|
| 4,396,193 A | | 8/1983 | Reinhardt et al. | .......... | 273/142 |
| 5,258,837 A | * | 11/1993 | Gormley | ...................... | 348/441 |
| 5,278,643 A | | 1/1994 | Takemoto et al. | .......... | 358/108 |
| 5,508,774 A | | 4/1996 | Klees | ......................... | 354/266 |
| 5,788,507 A | * | 8/1998 | Redford et al. | ......... | 434/307 R |
| 5,801,766 A | | 9/1998 | Alden | ........................ | 348/157 |
| 6,236,736 B1 | * | 5/2001 | Crabtree et al. | ............ | 382/103 |
| 6,270,404 B2 | * | 8/2001 | Sines et al. | .................... | 463/12 |
| 6,503,147 B1 | * | 1/2003 | Stockdale et al. | ............ | 463/29 |
| 6,517,436 B2 | * | 2/2003 | Soltys et al. | .................. | 463/29 |

FOREIGN PATENT DOCUMENTS

| | | |
|---|---|---|
| GB | 2322996 A | 9/1998 |
| GB | 2323236 A | 9/1998 |
| WO | WO 9511067 | 4/1995 |

* cited by examiner

*Primary Examiner*—Xuan M. Thai
*Assistant Examiner*—Robert Mendoza
(74) *Attorney, Agent, or Firm*—Baker Botts L.L.P.

(57) ABSTRACT

Disclosed is a casino security system for a gaming table comprising at least one video camera for providing video images of the gaming table and a video recorder for recording the video images of the gaming table. Events during playing of the game are detected and used to control the resolution of the video images of the gaming table appropriately and to superimpose information on the recorded video images.

23 Claims, 6 Drawing Sheets

CASINO VIDEO SECURITY SYSTEM

CROSS REFERENCE TO RELATED APPLICATIONS

This is a continuation of international application PCT/GB01/00282 filed Jan. 24, 2001, incorporated by reference herein, published in English under PCT Article 21(2) on Jul. 26, 2001 as international publication WO 01/52957 A1, and claiming priority of British application 0001591.7 filed Jan. 24, 2000, which is incorporated by reference herein.

BACKGROUND OF THE INVENTION

TECHNICAL FIELD OF THE INVENTION

The present invention generally relates to a casino video security system for monitoring a gaming table.

Cheating by gamblers in casinos is a major problem for casino operators. One of the most common forms of cheating at the gaming table involves placing one's stake—or increasing the size of one's initial stake—after the outcome of the game is known. This can be carried out in many ways, including placing chips in a winning number or associated region, or placing additional chips on top of existing chips.

The problem is well known to casino operators, and croupiers are expected to observe the players to detect such behavior. However, because the croupiers have other tasks to perform, they cannot always be vigilant, particularly with a large number of players at the gaming table. It is therefore common practice to use security cameras to provide video images of gaming tables to be centralized control room for monitoring purposes. The problem with this is that there are a large number of gaming tables to observe.

SUMMARY OF THE INVENTION

It is therefore an object of the present invention to provide a casino security system which takes it easier to detect cheating at a gaming table.

It is a further object of the present invention to provide a casino security system which facilitates the rapid resolution of betting disputes.

A first aspect of the present invention provides a casino security system in which events occurring in the game played on a gaming table are automatically detected. Video images of the gaming table are produced, and in response to detected events during the game, higher resolution images of regions of the gaming table are automatically generated, for example, by zooming in on the betting area of a gaming table. This automatically provides for more information for the remote monitoring and later review of the behavior at the gaming table after events.

This aspect of the present invention is particularly suited, but not limited, to use with a roulette table. Events monitored during the roulette game include the automatic detection of the point at which no more bets should be placed, and the automatic detection of the winning number. Also, the start of the game can be detected, e.g., when a ball is placed in the rim of the roulette wheel. When a signal indicating "no more bets" is obtained, such as by detecting when the ball is about to leave the rim of the roulette wheel for example, a high resolution image of the betting area is generated in an embodiment of the present invention to enable the easiest detection of late bets.

In another aspect of the present invention, a casino security system comprises a video camera to provide a wide angle view of the gaming table. When an indication is given that no more bets should be made—e.g., either manually by the croupier or automatically—the video camera zooms in on the betting area to provide a high resolution image. Also, motion is monitored within the betting area, and if motion is detected after the point at which no more bets should be placed, a warning is generated.

In a further aspect of the present invention, a casino security system includes a detection means for detecting events during a game. Video images of the gaming table are produced, and event notifications are superimposed on the video images based on the detected events. The events can, for example, comprise winning information, and an indication of a late bet. This provides a wealth of information for security purposes and for dispute resolution.

A further aspect of the present invention provides a casino security system in which game events are detected and video images of the gaming table are recorded. In order to aid retrieval of video images when necessary for security purposes or dispute resolution, the video images are indexed with regard to the detected events. Thus selected sections of the recorded video images can easily be retrieved by their index. In one embodiment, the start of each game on the gaming table can be detected and each game can be sequentially indexed. In this way, the video recording of a game can be easily retrieved by reference to its position in the sequence. In a more specific embodiment, for example for a roulette table, indexing can be performed using winning numbers detected from the roulette wheel. The sequence can thus comprise the winning number sequence.

BRIEF DESCRIPTION OF THE DRAWINGS

For a more complete understanding of the present invention, reference is made to the following detailed description of exemplary embodiments with reference to the accompanying drawings, in which.

DETAILED DESCRIPTION OF EXEMPLARY EMBODIMENTS

Figure 1:
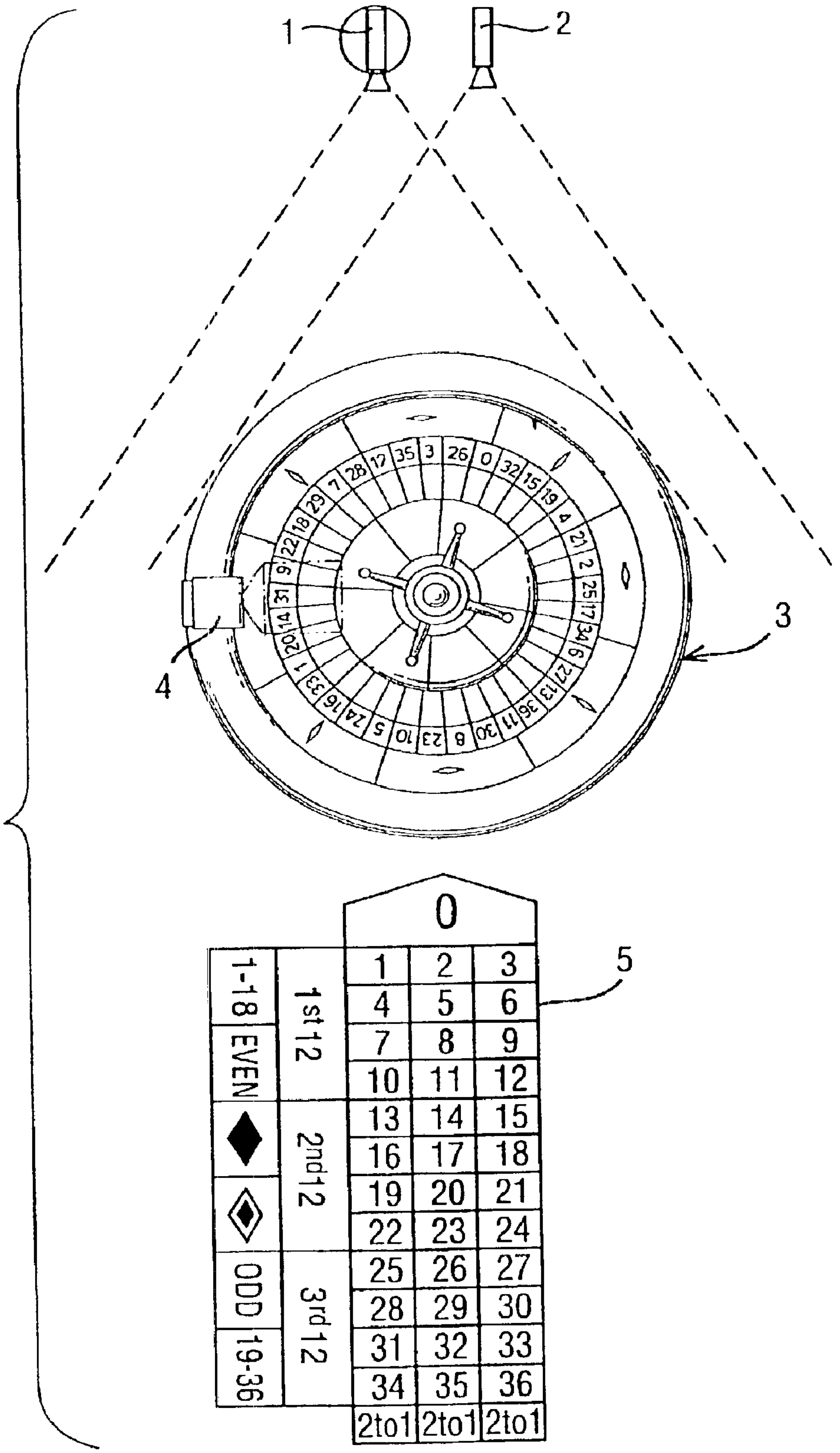
FIG. 1 is a schematic diagram of the arrangement of monitoring components at a roulette table.

FIG. 1 illustrates the positioning of components for monitoring a roulette game at a roulette table. The roulette table includes a roulette wheel 3 and a betting area 5 on which bets can be placed. In order to detect events occurring during the game, a detection head 4 is provided on the rim of the roulette wheel 3. The detection head is of a form commonly in use in casinos and can, for example, comprise the detection head as disclosed in WO 95/28996. In the preferred embodiment, however, use is made of the improved detection head disclosed in international application number PCT/GB01/00276, international filing date Jan. 24, 2001, international publication number WO 01/55988, published on Aug. 2, 2001, the content of which is hereby incorporated by reference. The detection head 4 is able to detect the passing of the ball around the rim and thus identify when a ball is in play, i.e., to generate a "game start" signal. It can also measure the speed of the ball passing underneath it around the rim to thereby predict when the ball is about to drop towards the pockets, thereby producing a "no more bets" signal. Further, the detection head 4 is able to identify the pocket in which the ball lands, thus generating a "winning number" signal. These signals are used for various video controls and will be described in more detail hereinafter.

Two video cameras 1 and 2 are provided at a location giving a view of the roulette wheel 3 and the betting area 5. The first camera 2 comprises a static camera, which produces a static field of view which includes the betting area 5 and at least a part of the roulette wheel 3. The second video camera 1 is capable of panning, tilting and zooming and is commonly termed a PTZ camera. This camera can provide a wide angle field of view of the roulette table, including the roulette wheel 3 and the betting area 5 as well as the surrounding area of the table encompassing the players and the croupier. The PTZ camera 1 is able to zoom in on the betting area 5 and also further zoom in on any specific areas within the betting area, i.e., the payout areas when there is a winning number. For example, when the ball falls in pocket number 3, the PTZ camera will zoom in on the number 3 area of the betting area 5, and will provide an image of that square and its neighboring squares because of adjacent bets. The PTZ camera 1 can also be made to view the associated payout areas, e.g., the "ODD" square, the "1-18" square, the "black" square, the "1$^{st}$ 12" square and the middle column "2 to 1" square. Thus, the sequence of video images of the payout areas associated with the winning number can be obtained. Preferably, the sequence is carried out starting at the periphery of the betting area and ending up at the winning number square, because the croupier will first clear chips and payout winnings for the peripheral regions of the betting area. This ensures that the images of the payout areas are not disturbed by the croupier.

High resolution images of the payout area or areas are recorded to enable the number of chips placed in the payout area or areas to be easily identified and disputes regarding payouts to be easily resolved. This therefore enables the detection of cheating when chips are added to a stack of chips in the payout area.

Figure 2:
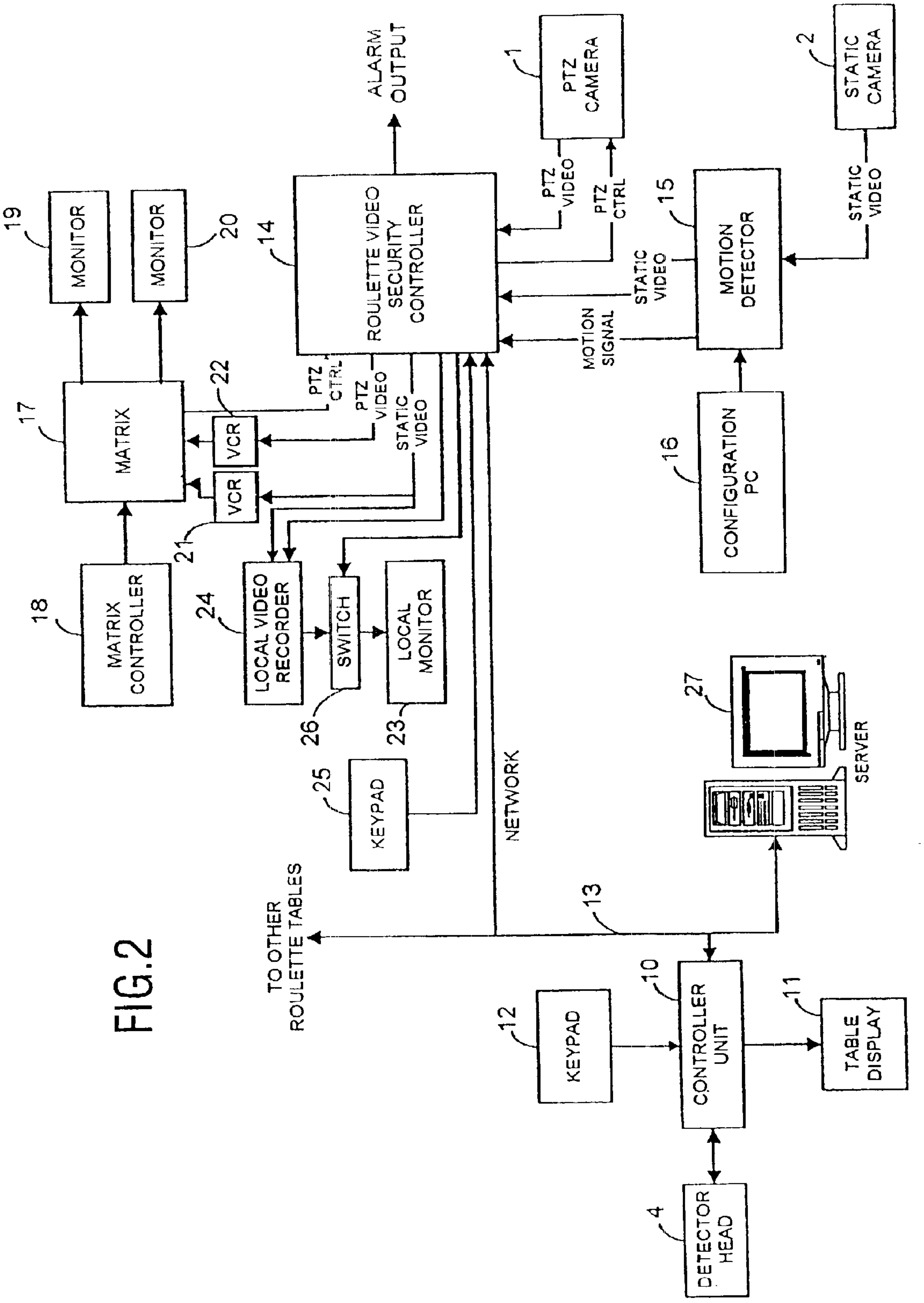
FIG. 2 is a schematic diagram of a casino security system in accordance with an embodiment of the present invention.

The structure of the casino security system will now be described in more detail with reference to FIGS. 1 and 2.

The casino security system comprises the detector head 4 arranged on the rim of the roulette wheel 3. This is controlled by a controller unit 10 which can receive instructions by a keypad 12. The controller 10 also controls a table display 11 which provides for the display of information to the players such as "Game Start", "No More Bets", "Winning Number" and "Game Over". The "Game Start", "No More Bets" and "Winning Number" information is obtained from signals output from the detector head. This information is output by the controller 10 over a network 13 within the casino. The network 13 may network many other roulette tables and is managed by a server 27. The server 27 can also provide for conventional management functions and analysis.

Connected to the network 13 there is provided a roulette video security controller 14. The roulette video security controller 14 receives analog video signals from the PTZ camera 1 and outputs PTZ controller instructions to the PTZ camera 1 to control its pan, tilt and zoom operation. The roulette video security controller 14 also receives an analog video input from the static camera 2. The static camera 2 outputs analog video data to a motion detector 15. The motion detector 15 detects motion within a designated area of the image and outputs a motion signal to the roulette video security controller 14.

The designated area for which motion detection is carried out by the motion detector 15 is designated by an operator using a configuration PC 16. The configuration PC 16 is able to download a single image frame from the motion detector 15. Within the image frame, the user can manually designate a region in which motion detection is to be carried out. The coordinates of this region are then input to the motion detector 15 to be used in the motion detection process as will be described in more detail hereinafter.

The roulette video security controller 14 thus receives the static video input, the PTZ video input, a motion signal, and the event signals over the network 13. The roulette video security controller 14 thus operates, as will be described in more detail hereinafter, to superimpose text on the video images in dependence upon the detected events and the motion signal. For example, in the roulette game, the roulette video security controller 14 can superimpose a "Game Start" notification when the game starts. When the "no more bets" signal is received, the text message "No More Bets" can be superimposed on the video. If motion is detected after the "no more bets" signal is received, a warning message can be superimposed on the video. When the "game over" signal is received, a "Game Over" message can be superimposed on the video. Thus, the roulette video security controller 14 outputs the PTZ video with text superimposed and the static video with text superimposed. These video signals are received by respective video recorders 21 and 22 and by a matrix 17. The matrix 17 acts as a switch to interconnect the video recorders 21 and 22 with respective monitors 19 and 20. Also, as is conventional in casino video security systems, text overlay devices can be provided before the video recorders 21 and 22 in order to add information identifying the gaming tables, for example. The switching function of the matrix 17 is controllable by a matrix controller 18. The matrix controller 18 is also able to generate PTZ control signals which are output by the matrix 17 to the roulette video security controller 14. The PTZ control signals received by the roulette video security control 14 are output to the PTZ camera 1, in combination with any PTZ control signals generated by the roulette video security controller 14, in order to control the operation of the PTZ camera 1, e.g., when it is required to zoom in on the betting area automatically.

In this embodiment of the present invention, the casino security system is also provided with a local video playback capability. A local monitor 23 is provided at the roulette table for play back of video recordings of previous roulette games in order to allow a croupier to resolve disputes with players. A local video recorder 24 is provided to allow the croupier to selectively play back recorded video with overlaid text on the local monitor 23. A keypad 25 is provided for entering controls by the croupier. The keypad 25 sends the input instructions to the roulette video security controller 14. Roulette video security controller 14 generates control messages in response to the local video recorder and to a switch 26 provided between the local video recorder 24 and the local monitor 23. There is also a video feed of the analog video signal from the static camera 2 with overlaid text provided to the local video recorder 24.

In this embodiment, spare processing capability within the roulette video security controller 14 is utilized, and it is for this reason that the keypad instructions are sent to the roulette video security controller 14 and control instructions are returned to the local video recorder 24 and the switch 26. The switch 26 prevents the video from being displayed on the local monitor 23, except when the croupier requests video playback from the local video recorder 24. This enables a croupier to deal with disputes with players quickly at the roulette table without having to involve the control room, which can result in a significant delay in play proceeding on the table.

Figure 3:
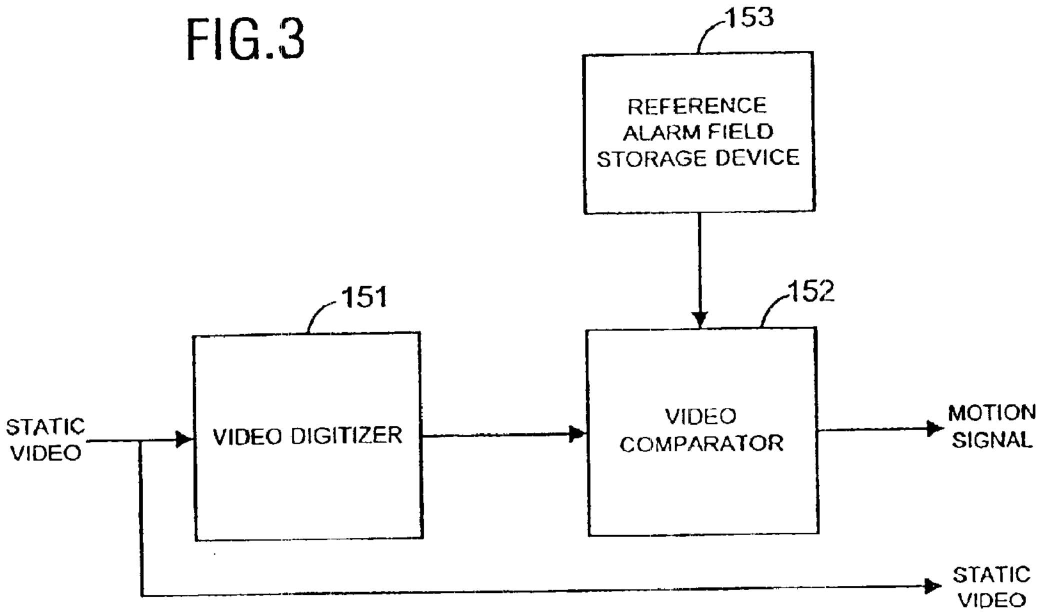
FIG. 3 is a schematic diagram of the motion detector in the embodiment of FIG. 2.

Details of the motion detector 15 will now be described in more detail with reference to FIG. 3.

A video digitizer 151 receives the analog video from the static camera. The digitized video generated by the video digitizer 151 is then input into a video comparator 152. The video comparator compares designated pixels in a frame with subsequent frames to detect motion in those pixels. Storage device 153 stores a reference alarm field provided by the configuration PC 16. The reference alarm field comprises pixel coordinates to be used for frame comparison by the video comparator 152. In this embodiment of the present invention, in order to detect objects such as chips or player's hands moving into the betting area 5 after the "more bets" signal has been generated, a cordon is provided around the betting area in the side on which the players are situated, i.e., on the left hand side of the betting area 5 in FIG. 1. The cordon comprises a band of pixels (e.g., at least 10) surrounding the outer edge of the betting area 5 on the sides facing the players. Thus, the frame comparison carried out by the video comparator 152 comprises a simple comparison of a line of pixels from frame to frame. If motion is detected between frames, the video comparator 152 outputs the motion signal.

The motion detector 15 also passes through the analog video from the static camera 2.

Figure 4:
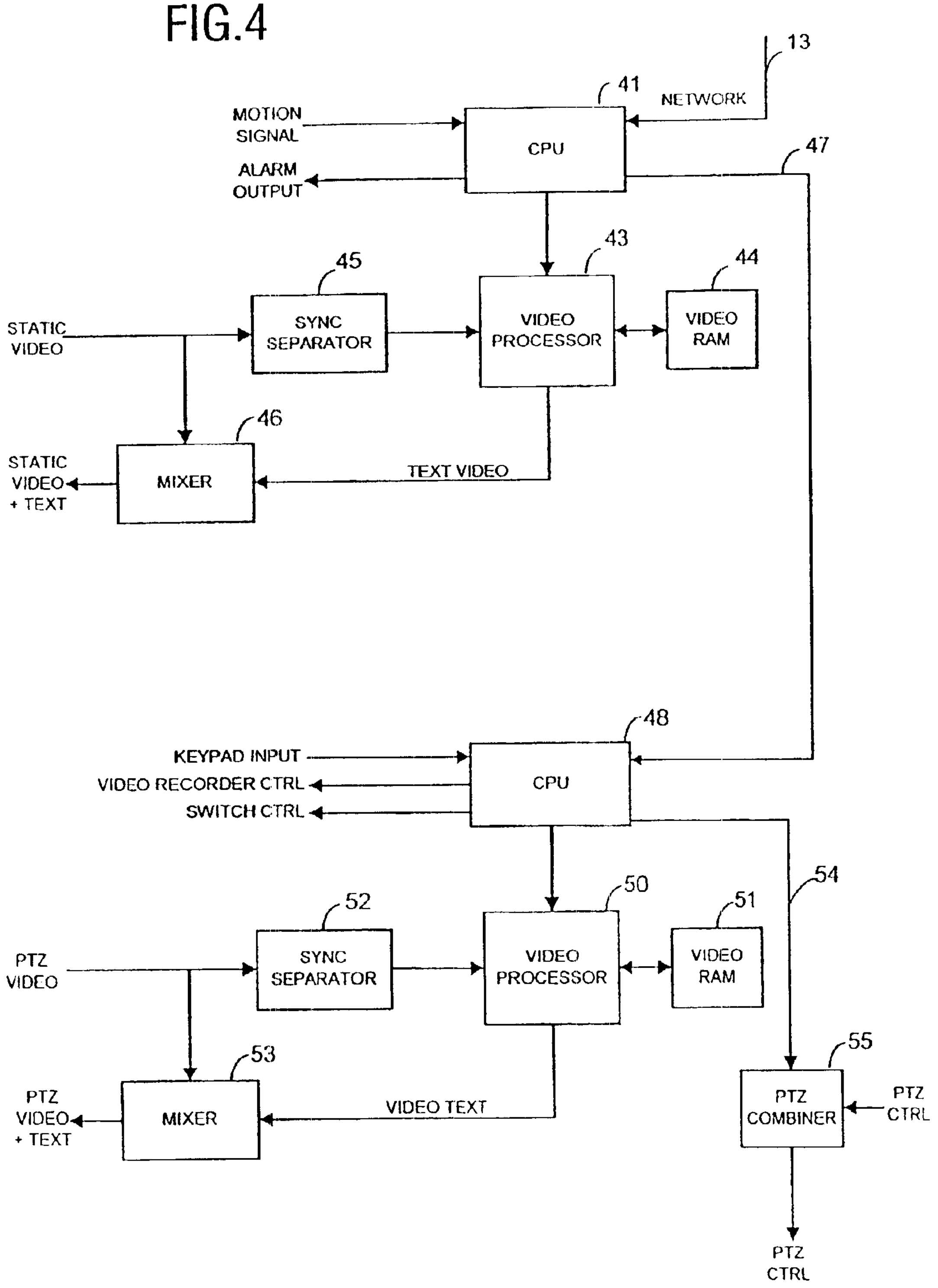
FIG. 4 is a schematic diagram of the roulette video security controller to the embodiment of FIG. 2.

Details of the structure of the roulette video security controller 14 will now be described in more detail with reference to FIG. 4.

A first central processing unit (CPU) 41 has a control input for receiving a motion signal. It is also provided with a connection to the network 13. Thus the first CPU 41 will receive the detected event signals and the motion signals. The first CPU 41 operates under the control of program code stored in on board flash memory, which also stores text messages which are to be superimposed on the video signal in response to detected events. Thus, the first CPU 41 receives the detected event signals from the network 13 and the motion signal, and generates appropriate text messages which are output to a first video processor 43. The first video processor 43 operates to generate a video signal in sync with the static video signal by receiving a sync signal from the first sync separator 45. The first video processor 43 uses first video random access memory (RAM) 44 as working memory for the video processing operation. The first video processor 43 thus generates a text video signal. The text video signal is output to a first mixer 46 which also receives the analog video signal from the static camera 2. The first mixer 46 thus mixes the analog text video signal with the analog video signal from the static camera.

The first CPU 41 also generates an alarm output on a control output. The alarm output is generated if the motion signal is detected after having received a "no more bets" signal over the network 13. Further, the first CPU 41 is provided with a serial connection 47 to a second CPU 48. The first CPU 41 passes on the event detection signals and an alarm signal, if generated.

The second CPU 48 implements program code read from on board flash memory, which also stores text to be superimposed on the video output of the PTZ camera 1. Thus, the second CPU 48 generates appropriate text message in dependence upon the event detection signals and the alarm signal received over the serial line 47. The text is input to a second video processor 50. The second video processor 50 generates analog video signals for text using a second video RAM 51 as a working memory, and by taking a synchronizing signal from a second sync separator 52. The text video signal output from the second video processor 50 is input to a second mixer 53. The input analog video signal from the PTZ camera 1 is input to the second sync separator 42 for synchronization of the generation of the text video signal by the second video processor 50. Also, the analog video from the PTZ camera 1 is input to the second mixer 53 for mixing with the analog text video signal from the second video processor 50. Thus the second mixer 53 generates a video signal with superimposed text.

The second CPU 48 is also provided with a serial line 54 for the output of PTZ control data to the PTZ camera 1, to control the panning, tilting and zooming of the PTZ camera 1, in order to zoom in on the betting area 5 when the "no more bets" signal is received, and to zoom in on the payout area when the "winning number" signal is received. Because the matrix controller 18 also requires the ability to control the PTZ camera 1, a PTZ combiner 55 is provided to combine the PTZ control signal generated by the second CPU 48 and the PTZ control signal received from the matrix 17.

The PTZ controls generated by the second CPU 48 simply comprise position numbers. For example, winning number 1 comprises position 1, winning number 2 comprises position 2, winning number 0 comprises position 37, zoom in to the betting area 5 comprises position 38, and wide angle mode comprises position 39. The PTZ camera 1 can be configured using a joy stick provided on the matrix controller 18. The PTZ camera 1 can be moved manually using the joy stick to provide the required image. The matrix controller 18 can then allow that position to be encoded. This process can be repeated for all of the necessary images, and thus when the roulette video security controller 14 is required to control the PTZ camera 1 to the necessary zoom level and position, all that is required is to output a position number.

The second CPU 48 also receives the input from the key pad 25. The second CPU 48 thus carries out processor operations to generate the local video recorder control data and the switch control data.

Figure 5:
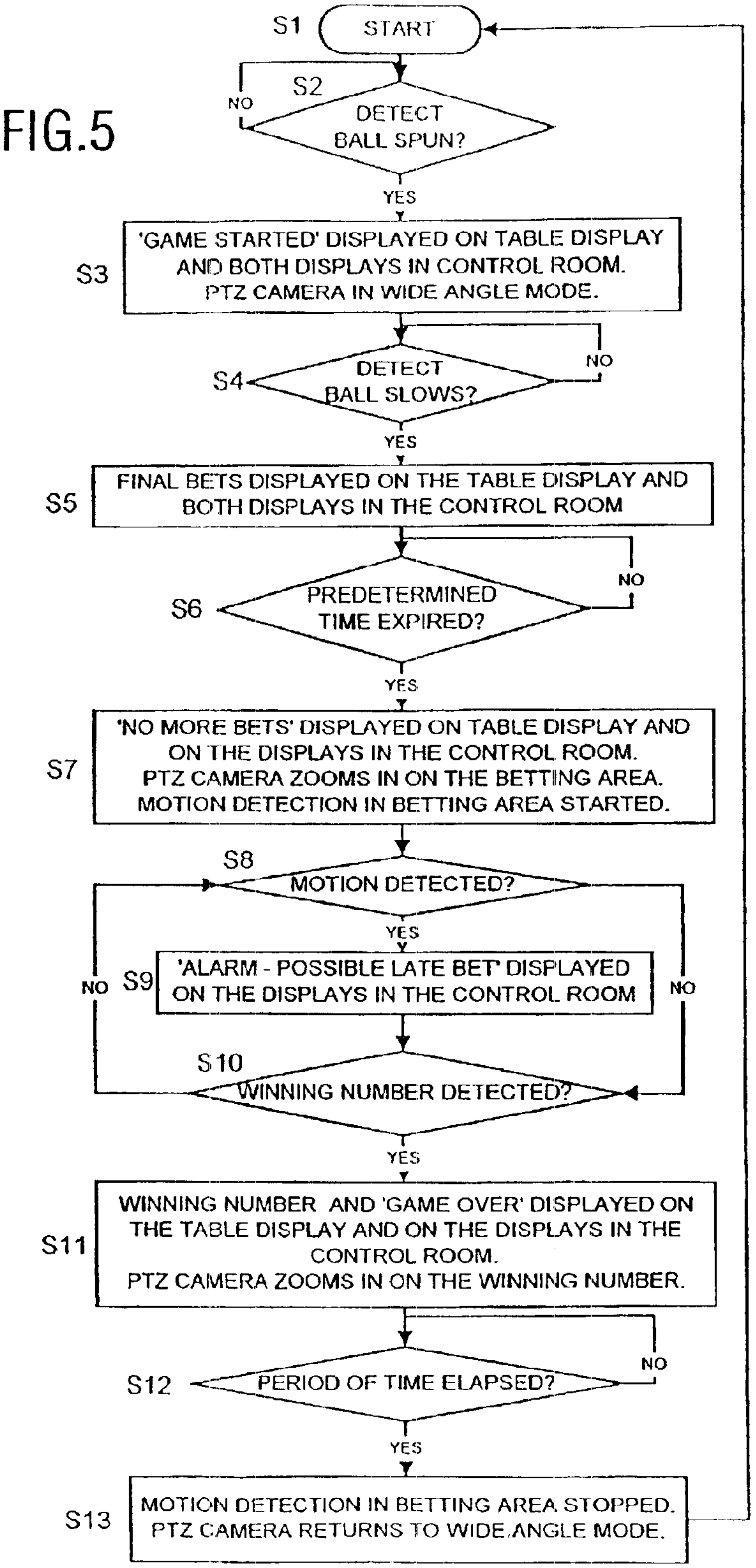
FIG. 5 is a flow diagram illustrating the method of operation of the system of FIG. 2.

The operation of this embodiment of the present invention will now be described in more detail with reference to the flow diagram of FIG. 5.

In step S1 the process starts, and in step S2 the detector head 4 detects whether the ball has been spun. The process waits until the ball has been detected as being spun in step S2, and then in step S3 the "game start" signal is generated, causing "Game Started" to be displayed on the table display 11, on the two displays 19 and 20 in the control room, and on the local display 23. Also the PTZ camera 1 is set in wide angle mode to generate video images of the roulette table and surrounding area.

The process then waits until the detector head 4 detects that the ball has slowed to a predetermined speed in step S4. When this occurs, in step S5 "Final Bets" is displayed on the table display, on both displays in the control room, and on the local display 23. "Final Bets" is displayed for a predetermined period by waiting for the period to expire in step S6. Once this period has expired, in step S7 "No More Bets" is displayed on the table display 11, on the two displays 19 and 20 in the control room, and on the local display 23. The PTZ camera 1 also zooms in on the betting area 5 and motion detection in the betting detection area is started. If motion is detected in step S8, in step S9 the alarm signal is generated and "Alarm—Possible Late Bet" is displayed on the two displays 19 and 20 in the control room and on the local display 23. Once a winning number is detected in step S10, in step S11 the winning number and "Game Over" is displayed on the table display 11, on the two displays 19 and 20 in the control room, and on the local display 23. Also, the PTZ camera 1 zooms in on the winning number region (pay out region) in the betting area 5. This zooming in can either take the form of simply looking at the winning number square or looking at any of the pay out areas associated with the winning number.

After a period of time has elapsed (step S12) in step S13, motion detection in the betting area 5 is stopped and the PTZ camera 1 is returned to the wide angle mode. The process then returns to the start (step S1).

Because detected event signals are available, in this embodiment of the present invention, event information can be sent to the video recorders 21 and 22 for indexing of the recorded video. For example, when each "game started" event occurs, a game number can be associated with the video as an index, allowing the easy retrieval of the video associated with the game simply by using the game index. Alternatively, or in addition, the game can be indexed by the sequence of winning numbers.

Figure 6:
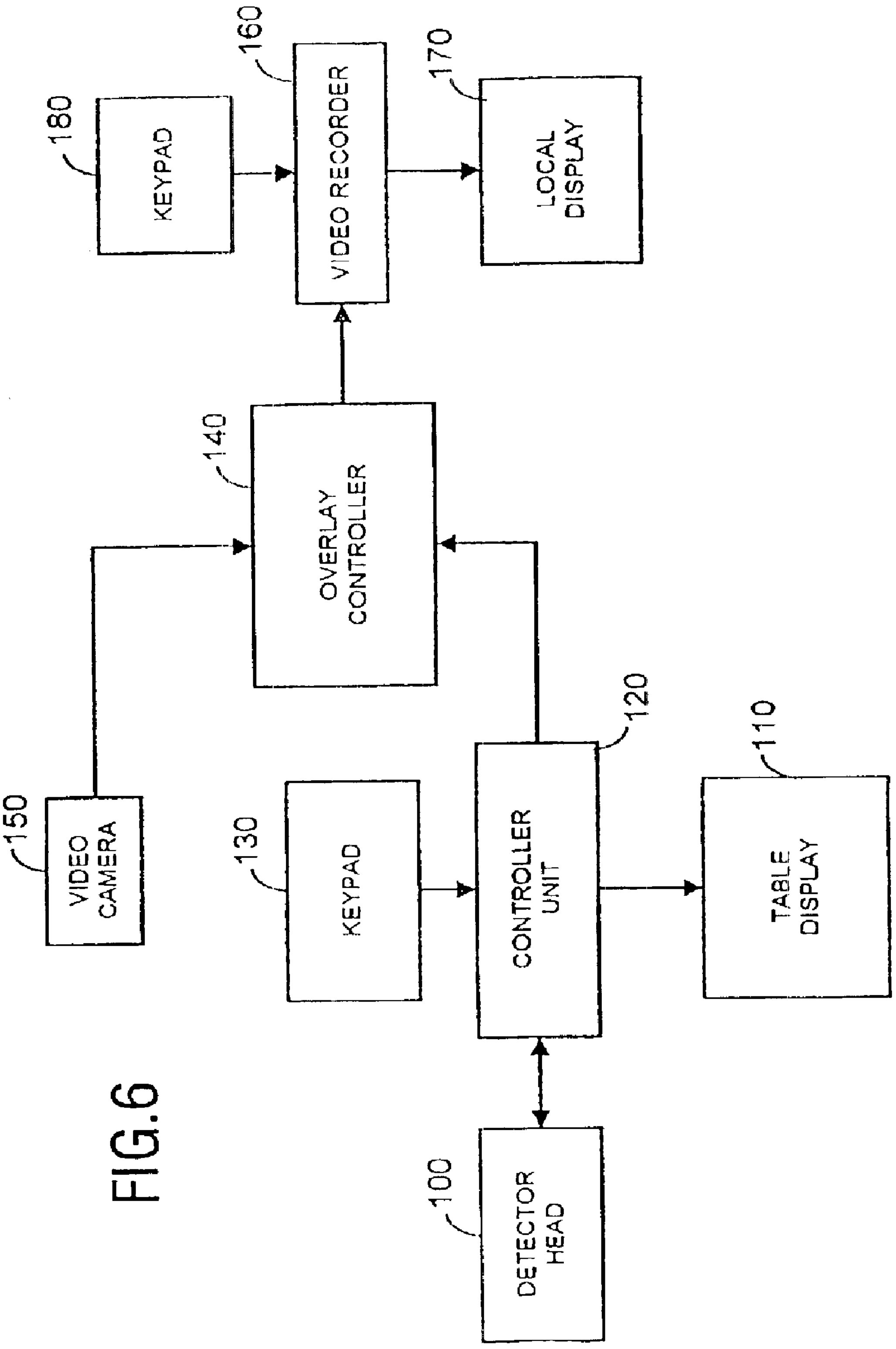
FIG. 6 is a schematic diagram of a casino security system of the second embodiment of the present invention.

A second embodiment of the present invention will now be described with reference to FIG. 6, which is a schematic diagram of the components of a casino security system.

A detector head 100 generates game event information as hereinbefore described with reference to the first embodiment. A controller 120 controls the detector head 100 and receives control requests from a keypad 130. The controller 120 also controls a table display at the table 110 for displaying event information. Components 100, 110, 120, 130 are the same as components 4, 11, 10 and 12 in the embodiment of FIG. 2. Thus the output of the controller 120 to an overlay controller 140 comprises event information such as "Game Started", "No More Bets", and "Winning Number". A video camera 150 provides a video image of the roulette table. This video image is input to the overlay controller 140 which generates a video signal in which text is overlaid on the video images. The principles of operation of the overlay controller 140 are similar to those described in the first embodiment with reference to FIG. 4. A video recorder 160 is provided to receive the overlaid video signals, and a display 170 is provided for the display of the overlaid video signals. The video recorder 160 is controlled by the keypad 180.

In this embodiment of the present invention, a casino security system is provided in which event information is automatically detected during the roulette game, and information about the events is overlaid on the recorded video for the roulette table. This provides the casino managers with useful information on the progress of the game which has been automatically detected, rather than relying upon a visual inspection of the video images to identify the status of the game. This additional information can greatly aid analysis of the video images and the detection of cheating or payout errors.

Although the embodiments described hereinabove have been described with reference to the roulette table, aspects of the present invention are applicable to any gaming table in which events can be automatically detected during the game.

Further, although in the first embodiment a video motion detection system is used, the present invention is not limited to such a motion detection system. For example, the gaming table can be provided with appropriate sensors to detect motion.

The event detection implemented in accordance with aspects of the present invention can include event detection during any game. For example, the start of the game of poker could be detected by detecting the dealing of cards.

Although in the embodiments described hereinabove, a higher resolution image of the betting area or the payout areas is achieved by increasing the magnification, i.e., zooming in, the present invention covers any technique for obtaining a higher resolution video images to enable cheating and payout errors to be resolved in the images.

Although the present invention has been described hereinabove with reference to specific embodiments, it will be apparent to a skilled person in the art that modifications can be made within the spirit and scope of the present invention.

I claim:

1. A casino security system for a roulette table having a betting area comprising at least one payout area, and a roulette wheel with a rim, the system comprising:

a detector for automatically detecting during a roulette game when a ball in the roulette wheel is about to drop towards a pocket to generate a termination of betting signal and for automatically detecting during a roulette game when a ball in said roulette wheel is located in a pocket of the roulette wheel to generate a winning number signal;

at least one video camera for providing video images of said roulette table, the at least one video camera being responsive to a signal selected from the group consisting of said termination of betting signal and said winning number signal to zoom in on said betting area;

a motion detector for detecting movement into said betting area after generation of said termination of betting signal; and a warning generator responsive to said motion detector for generating a warning that movement into said betting area has been detected.

2. A casino security system according to claim 1, further comprising a mixer for superimposing the winning number on said video images, in response to said winning number signal.

3. A casino security system according to claim 1, wherein said motion detector is adapted to detect motion by comparing images in successive video frames from said at least one video camera.

4. A casino security system according to claim 1, wherein said at least one video camera comprises a first video camera for providing a video image of a fixed region including at least a part of said roulette wheel and said betting area, and a second video camera adapted to provide a video image of said roulette table and a region around said roulette table and to zoom in on said betting area in response to the signal selected from the group consisting of said termination of betting signal and said winning number signal; and said motion detector is adapted to compare image data in successive frames of the video images provided by said first camera to detect movement in said betting area.

5. A casino security system according to claim 1, further comprising:

a game event detector for detecting one or more events during each of a plurality of successive games played at said roulette table;

a video recorder for recording said video images of said roulette table;

an indexing means for successively indexing said recorded video images for successive games on the basis of said one or more events detected by said game event detector; and a retriever for retrieving recorded indexed video images based on said one or more detected events.

6. A casino security system according to claim 1, wherein said at least one video camera comprises a first video camera to provide video images of a fixed region of said roulette table comprising at least a part of said roulette wheel and said betting area, and a second controllable video camera to provide video images of said roulette table and surrounding players before generation of said termination of betting signal, and capable of zooming in on said betting area.

7. A casino security system according to claim 6, wherein said second controllable video camera is adapted to zoom in on at least one payout area in said betting area.

8. A casino security system according to claim 6, for a roulette table having a plurality of payout areas wherein said second controllable video camera is configurable to zoom in on of any one or more of said payout areas in said betting area.

9. A casino security system according to claim 6, for a roulette table having a plurality of payout areas wherein said second controllable video camera is adapted to respond to said winning number signal to provide successive zoomed in images of the a plurality of payout areas.

10. A casino security system according to claim 6, wherein said second controllable video camera is a pan, tilt and zoom camera.

11. A casino security system according to claim 1, further comprising a first mixer for superimposing upon said video images a warning that betting is terminated in response to said termination of betting signal.

12. A casino security system according to claim 11, further comprising a second mixer for superimposing upon said video images a warning that movement has been detected in response to said warning signal after generation of said termination of betting signal.

13. A casino security method for a roulette table having a betting area and a roulette wheel with a rim, the method comprising:

automatically detecting during a roulette game when a ball in the roulette wheel is about to drop towards a pocket;

generating a termination of betting signal when a ball in the roulette wheel is detected to be about to drop towards a pocket;

automatically detecting during a roulette game when a ball in said roulette wheel is located in a pocket of the roulette wheel;

generating a winning number signal when a ball in said roulette wheel is detected to be located in a pocket of the roulette wheel;

automatically detecting movement into said betting area after the generation of said termination of betting signal;

providing video images of said roulette wheel and in response to a signal selected from the group consisting of said termination of betting signal and said winning number signal to zoom in on said betting area; and generating a warning in said video images that movement into said betting area has been detected based on said automatic detection of movement.

14. A method according to claim 13 further comprising superimposing the winning number on said video images in response to said winning number signal.

15. A casino security method according to claim 13, further comprising providing from a static video camera, video images of a fixed region of said roulette table, said fixed region comprising at least a part of said roulette wheel and said betting area, and providing from a controllable video camera, video images of said roulette table and surrounding players before generation of said termination of betting signal and zooming in on said betting area.

16. A method according to claim 15, wherein said controllable video camera zooms in on at least one payout area in said betting area in response to the selected signal.

17. A method according to claim 15, for a roulette table having a plurality of payout areas wherein said controllable video camera provides successive zoomed in images of the plurality of payout areas.

18. A method according to claim 13, further comprising superimposing upon said video images a warning that betting is terminated, in response to said termination of betting signal.

19. A method according to claim 18, further comprising superimposing upon said video images a warning that movement has been detected after generation of said termination of betting signal, in response to said generated warning.

20. A method according to claim 18, wherein said automatically detecting movement step comprises comparing images in successive video frames of said video images.

21. A casino security system for a roulette table having a betting area comprising at least one payout area, and a roulette wheel with a rim, the system comprising:

a detector for automatically detecting during a roulette game when a ball in the roulette wheel is about to drop towards a pocket to generate a termination of betting signal and for automatically detecting during a roulette game when a ball in said roulette wheel is located in a pocket of the roulette wheel to generate a winning number signal;

at least one video camera for providing video images of said roulette table, the at least one video camera being arranged to zoom in on said betting area in response to said termination of betting signal and to further zoom in on a payout area in response to said winning number signal;

a motion detector for detecting movement into said betting area after generation of said termination of betting signal; and a warning generator responsive to said motion detector for generating a warning that movement into said betting area has been detected.

22. A casino security system according to claim 21, for a roulette table having a plurality of said payout areas wherein the at least one video camera is arranged to zoom in on the payout areas in a sequence ending on the winning payout area.

23. A casino security system for a roulette table having a betting area comprising at least one payout area, and a roulette wheel with a rim, the system comprising:

a detector having a detector head adapted to be directed at a section of the rim of the roulette wheel to detect when a ball passes through that section of the rim during a roulette game, the detector being configured to automatically produce a termination of betting signal when a ball in the roulette wheel is about to drop towards a pocket and to automatically detect when a ball in said roulette wheel is located in a pocket of the roulette wheel to generate a winning number signal;

at least one video camera for providing video images of said roulette table and being responsive to a selected signal from the group consisting of said termination of betting signal and said winning number signal to zoom in on said betting area;

a motion detector for detecting movement into said betting area after generation of said termination of betting signal; and a warning generator responsive to said motion detector for generating a warning that movement into said betting area has been detected.

* * * * *

UNITED STATES PATENT AND TRADEMARK OFFICE

CERTIFICATE OF CORRECTION

PATENT NO. : 6,908,385 B2
DATED : June 21, 2005
INVENTOR(S) : Green, Michael J.

It is certified that error appears in the above-identified patent and that said Letters Patent is hereby corrected as shown below:

Column 9,
Line 3, "the a plurality" should read -- the plurality --.

Signed and Sealed this

Thirteenth Day of December, 2005

JON W. DUDAS
*Director of the United States Patent and Trademark Office*